United States Patent [19]

Hill

[11] Patent Number: 5,274,605
[45] Date of Patent: Dec. 28, 1993

[54] DEPTH MIGRATION METHOD USING GAUSSIAN BEAMS

[75] Inventor: N. Ross Hill, Fullerton, Calif.

[73] Assignee: Chevron Research and Technology Company, San Francisco, Calif.

[21] Appl. No.: 904,067

[22] Filed: Jun. 26, 1992

[51] Int. Cl.⁵ .............................................. G01V 1/36
[52] U.S. Cl. .................................... 367/53; 367/50
[58] Field of Search ................................. 367/50–54, 367/73

[56] References Cited

U.S. PATENT DOCUMENTS 4,980,866 12/1990 Wang et al. ........................... 367/52

OTHER PUBLICATIONS

"Computation of Wavefields in Inhomogeneous Media–Gaussian Beam Approach," Cerveny et al., *Geophysical Journal of the Royal Society*, vol. 70, 1982, pp. 109–128.
"Gaussian Beam Migration", N. Ross Hill, *Geophysics* vol. 55, No. 11, (Nov. 1990), pp. 1416–1428.
"Radon Transform/Gaussian Beam Migration," Lazaratos et al., Oct. 1990, *Expanded Abstracts for the 60th Annual Meeting of the Society of Exploration Geophysicists*, pp. 1314–1317.
"Gaussian Beam Migration," da Costa et al., Oct. 1989, *Expanded Astracts for the 59th Annual Meeting of the Society of Exploration Geophysicists*, pp. 1169–1171.
"Efficient 2d and 3d Shot Record Redatuming," Kinneging et al., *Geophysical Prospectign 37*, 1989, pp. 493–530.
"Inverse Extrapolation of Primary Seismic Waves," Wapenaar et al., *Geophysics*, vol. 54, No. 7, (Jul. 1989), pp. 853–863.

Primary Examiner—Ian J. Lobo
Attorney, Agent, or Firm—Robert E. Krebs; John S. Reid; W. Keith Turner

[57] ABSTRACT

A process for depth migration of seismic wave information that has been derived from geological media that causes rapid lateral velocity variations in seismic waves. The process includes the step of decomposing wavefields recorded at the earth's surface using Gaussian beams as basic functions. Then, according to the process, the set of Gaussian beams is extrapolated downward into the earth to obtain the subsurface wavefield. Finally, the wavefield is processed to provide depth-migrated images of subsurface reflectors.

7 Claims, 3 Drawing Sheets

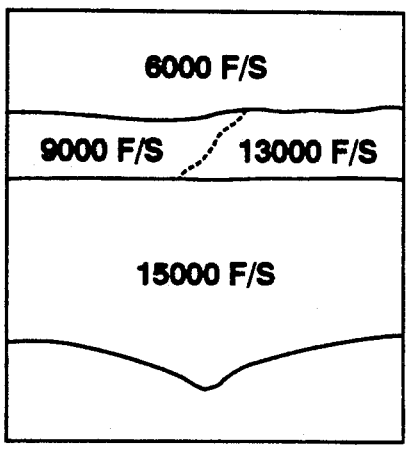
FIG._1A
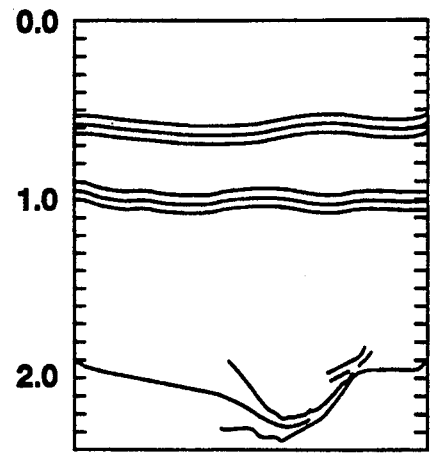
FIG._1B
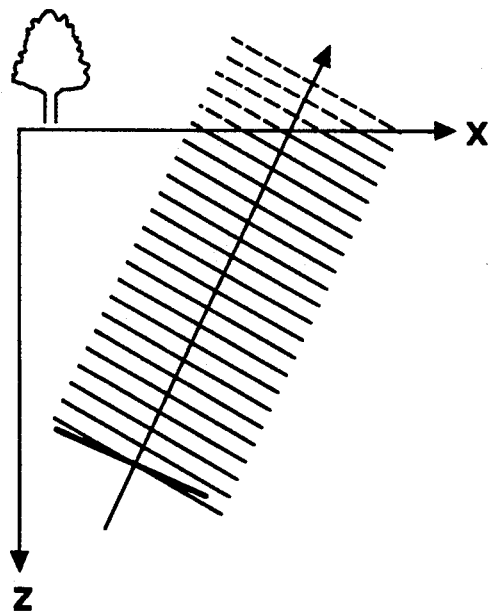
FIG._3A
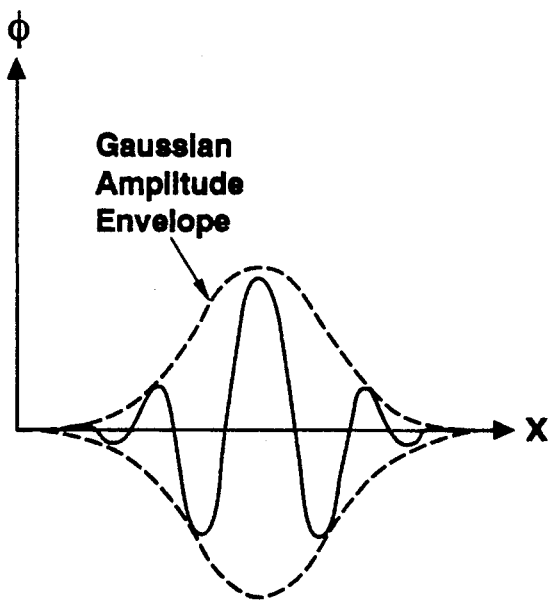
FIG._3B

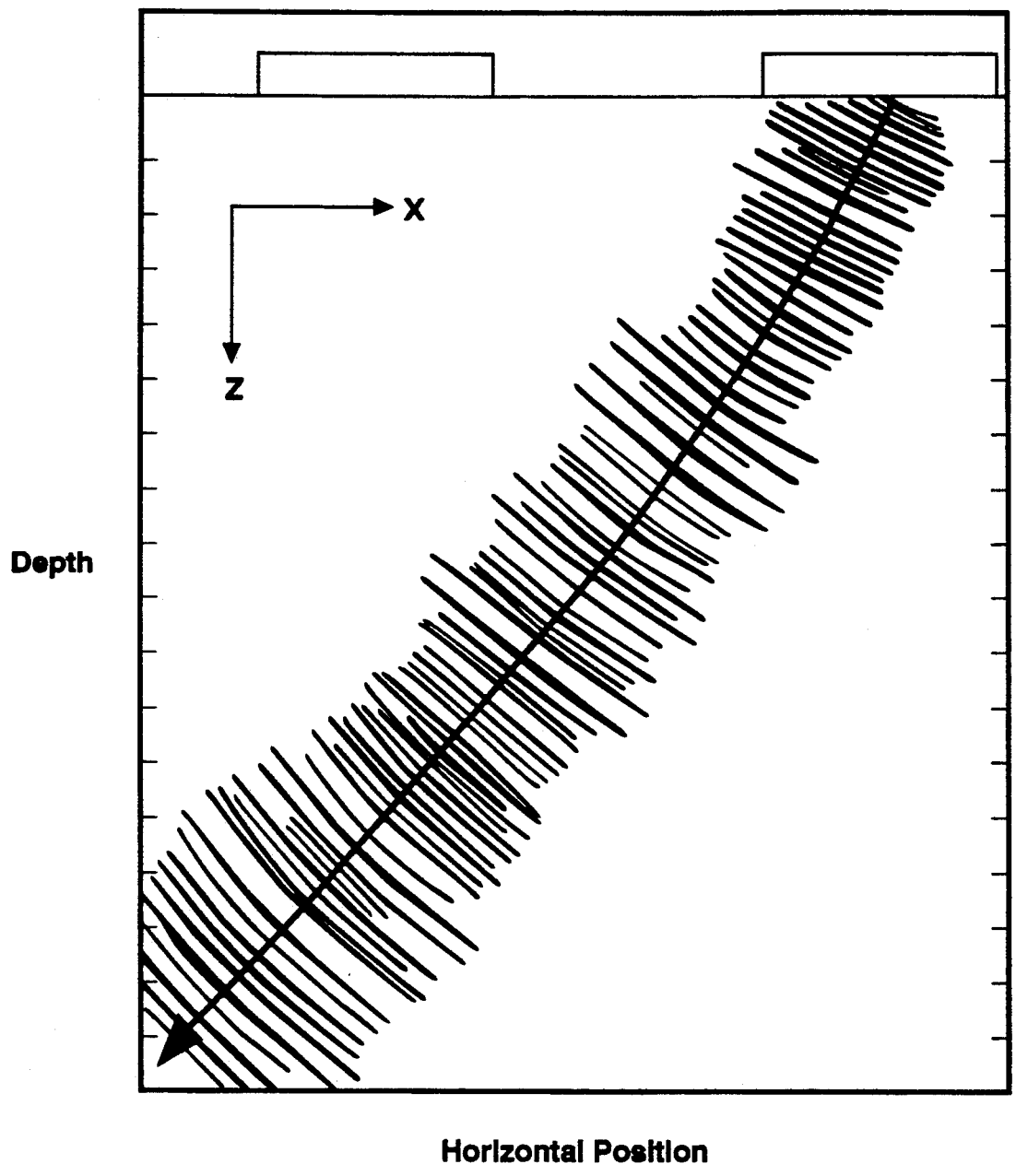
FIG._2

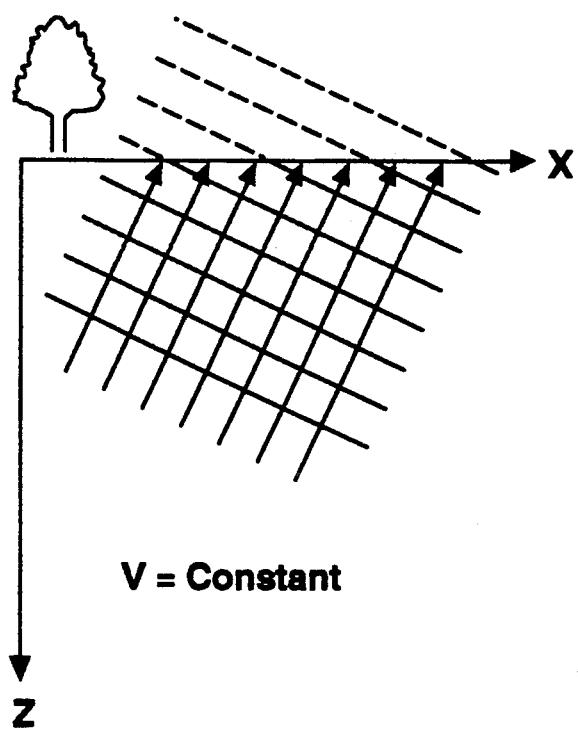
FIG._4
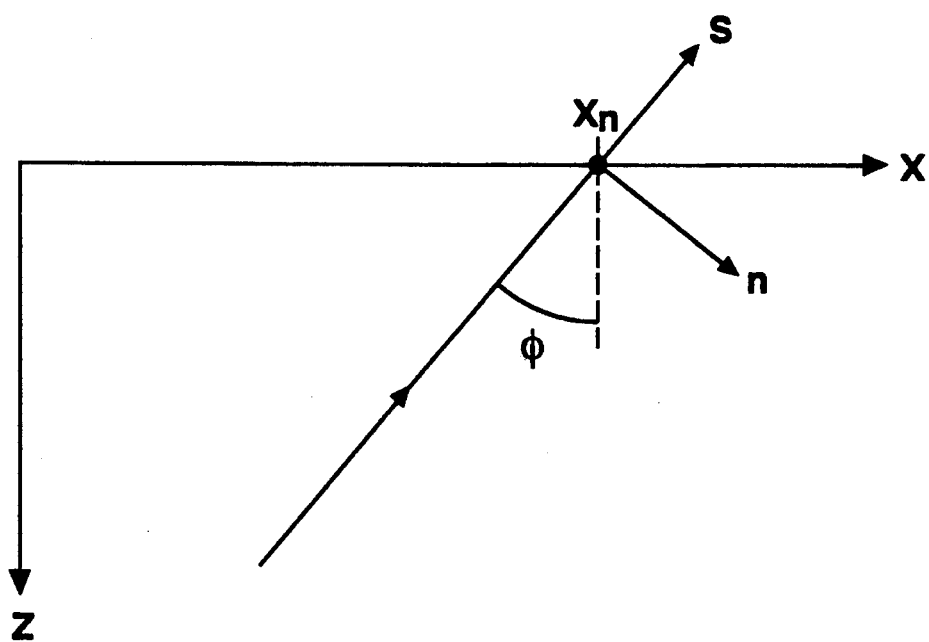
FIG._5

DEPTH MIGRATION METHOD USING GAUSSIAN BEAMS

BACKGROUND OF THE INVENTION

1. Field of the Invention

The present invention generally relates to processes for migrating seismic wave information and, more particularly, to processes for depth migration of seismic waves that contain rapid lateral velocity variations.

2. State of the Art

A primary goal of reflection seismology is to obtain accurate images of subsurface geological formations based upon surface recording of reflections of seismic waves that are purposefully directed into the earth. Toward that end, it is well known that seismic waves recorded by geophones or hydrophones at the earth's surface can be displayed as two-dimensional or three-dimensional seismic "time sections", each consisting of a large number of seismic traces. Although visual inspection of seismic time sections can intuitively suggest shapes and locations of subsurface reflecting formations, the visually-apparent images may be inaccurate or misleading. For example, when seismic information is recorded in geological media whose characteristics vary substantially in the horizontal direction, visual consideration of time sections can lead to erroneous conclusions as to the actual shapes and locations of subsurface reflectors. Accordingly, in practice, recorded seismic information usually is manipulated for the purpose of producing migrated sections that depict the proper spatial locations of subsurface reflectors.

Various geological conditions can cause lateral velocity variations in seismic waves. For example, overthrust zones can produce strong lateral velocity variations in seismic waves passing through the zones. Also, salt intrusion into sediments can cause substantial velocity variations in seismic waves that pass through the sediments.

Conventional time migration programs operate to focus diffracted energy to subsurface locations, but do not accurately account for rapid lateral velocity variations in seismic waves. The imaging programs that do account for lateral velocity variations caused by changes in geological media are, by way of distinction, called depth migration programs.

The results of seismic depth migration programs are normally based upon models of the geology being imaged. Therefore, when actual geological conditions differ substantially from conditions assumed within a given model, migration programs are likely to yield inaccurate results. In particular, the results provided by depth migration programs usually are sensitive to the particular seismic velocity models that are employed.

Seismic velocity models are normally based upon geological information, structural concepts, and upon analysis of the seismic data. In practice, velocity models are usually constructed separately from depth migration programs. However, the results of actual depth migrations are often considered, particularly during pre-stack procedures, for purposes of improving velocity models.

In current practice, time migration programs use one of three methods for time-migrating seismic data: the finite differencing method, the phase shift method, or the Kirchhoff method. Although these three methods can be extended for use in depth migration programs, the most common implementations of finite differencing methods cannot predict steeply sloping geological structures. The less commonly used "reverse time" finite differencing migration method can predict steeply sloping structures, but that method usually creates spurious reflection images when strong variations in seismic wave velocities exist. Also, the reverse-time method is computationally expensive.

In the Kirchhoff time migration method, a mapping is made of reflector positions that could cause energy to arrive on a particular wave trace at a particular time. Because time migration programs usually assume simple velocity variations, an analytical expression is sufficient for calculating the shapes of wavefronts. For example, the Dix equation can be employed for determining wavefront shapes when wave velocity through a geological media depends only on depth, and when large dips are not to be retained in the migrated images.

General closed-form analytical expressions do not exist, however, for use in the Kirchhoff method to provide accurate migration of seismic information derived from geological media that produce strong lateral velocity variations in seismic waves. In cases where there are strong lateral wave velocity variations in the seismic waves passing through such media, the Kirchhoff method is often extended beyond time migration by using standard ray tracing methods to construct wavefronts. The standard ray tracing methods fail, however, if there are multi-valued wavefronts and so-called shadow zones (i.e., zones where no rays pass), since those methods do not correctly describe interferences in multi-valued wavefronts. For example, standard ray tracing methods fail if a wavefront has a buried focus. Also, standard raypath methods erroneously predict rapidly varying, unbounded seismic wave amplitudes. Because multivalued wavefronts and shadow zones often occur in moderately complex geological structures, the practability of using standard raypath methods to extend the Kirchhoff method is limited.

Also in the seismology art, it is known to construct synthetic seismograms. A synthetic seismogram, generally speaking, is one produced by mathematical manipulations based upon models rather than by recording actual seismic reflections. Processes for constructing synthetic seismograms are sometimes referred to as forward modelling processes; one example of such a process is the Gaussian beam method.

The Gaussian beam method is known to be useful for modeling seismic energy in laterally varying geological media because that method overcomes many of the problems that are associated with other methods when dealing with shadow zones and multi-valued wavefronts. According to the Gaussian beam method, wavefields radiating from energy sources are computed by solving the wave equation using asymptotic expansions in ray-centered coordinates. The synthetic wavefields are constructed from acoustic energy source locations by adding beams of energy travelling in different directions, with each beam being a high-frequency solution to the wave equation. Normally, the synthetic wavefields are produced by computing a set of beams that simulate the acoustic energy source, propagating each of those beams to surface locations at which receivers are assumed to be located, and then summing the contributions from each of the propagated beams.

SUMMARY OF THE INVENTION

The present invention discloses a novel method for locating a subsurface reflector by the use of Gaussian beams. The method includes the steps of projecting Gaussian beams back into the earth from the surface. This technique, although related to "downward continuations" as described in the art, is referred to herein as an "extrapolation," which term implies that there are not any directional constraints from the projection. More particularly, the term extrapolation as used herein means the process of mathematically propagating Gaussian beams into the earth along the physically allowed ray paths which correspond to the Gaussian beams. Although the primary advantage of the present invention is that it handles depth migrations for seismic waves containing rapid lateral velocity variations, the method is particularly useful for imaging steeply sloping structures in that it has no dip limitations. For example, the method can locate overturned structures such as salt domes. Thus, applications wherein the Gaussian beams being extrapolated back into the earth eventually turn so that they are redirected upwards, as will occur with turning waves, are embodied within the present invention. No special steps are required for the present invention as described to be applied to turning waves. The invention also covers imaging reflections for both post-stack migrations and pre-stack migrations.

The Gaussian beams used in the method of the present invention are particularly useful in location the reflection point of turning waves. (In this context, turning waves are waves that turn so substantially due to refraction that the downwardgoing waves eventually turn upward. According to the present invention, turning wave reflection s can be used to locate overhanging structures such as the flanks of salt domes.

A primary benefit of the migration method of the present invention is that it is a robust method that can image steeply dipping reflectors where there is complex velocity structure. Another benefit of the migration method of the present invention is computational economy resulting from the fact that the Gaussian beam migration method employs many of the computational techniques of standard ray tracing.

BRIEF DESCRIPTION OF THE DRAWINGS

The present invention can be further understood by reference to the following description and appended drawings. In the drawings:

FIG. 1(a) is a diagram showing wave velocities in geological strata overlying a reflector;

FIG. 1(b) is a diagram showing an example of a migrated zero-offset section that could be produced when conventional time migration techniques are applied to the geological media of FIG. 1(a);

FIG. 2 is a diagram showing an example of a raypath, and the associated wavefields computed by the Gaussian beam method, at a particular instant in time.

FIG. 3(a) is a diagram showing one straight ray and selected wavefronts of a monochromatic Gaussian beam at a particular instant;

FIG. 3(b) is a diagram showing the wavefield of FIG. 3(a) along the surface at the same time instant;

FIG. 4 is a sketch showing a group of parallel Gaussian beams arriving at the earth's surface as a planar wavefront;

FIG. 5 is a diagram that illustrates a transformation from Cartesian coordinates (x,z) to ray-based coordinates (s,n).

DETAILED DESCRIPTION OF THE PREFERRED EMBODIMENT

FIG. 1(a) shows a subsurface reflector having a gull-like shape. As indicated in the drawing, the velocities of seismic waves that are directed at the reflector have magnitudes in the range of several thousand feet per second and vary according to the geological media overlying the reflector. For instance, at a depth of about eight hundred feet, wave velocities vary in the lateral direction from 9,000 ft/sec to 13,000 ft/sec.

FIG. 1(b) shows an example of a migrated zero-offset section that could be produced for the geological media of FIG. 1(a) by employing a standard time migration algorithm followed by time-to-depth conversion. It should be noted that the zero-offset section does not accurately image an actual reflector. In conventional practice, inaccuracies arise because conventional time migration programs do not accurately refract energy through geological structures that are characterized by laterally varying velocities. Also, in conventional practice, errors arise because small inaccuracies in calculating the direction of propagation of a wavefront can cause large errors in positioning of subsurface reflectors.

FIG. 2 shows, by way of example, a multi-chromatic Gaussian beam at a particular instant. (The term "multi-chromatic" denotes that the beam is comprised of a finite series of monochromatic Gaussian beams that are summed over a range of temporal frequencies.) In the drawing, values along the horizontal axis represent distance along the earth's surface and values along the vertical axis represent distance below the earth's surface. The heavy line extending upward from the lower left corner to the upper right corner of the drawing indicates that all of the summed Gaussian beams are constructed from the same ray path. Thus, the drawing is analogous to a snapshot of the wavefronts and indicates that, as time passes, the individual wavefronts move downward along the ray path.

Each wavefront of the Gaussian beam in FIG. 2 is characterized by the fact the amplitude of each of its temporal frequency components decreases as a Gaussian function of distance from the ray path. Also, the wavefronts are characterized by the fact that they approximately satisfy the scalar wave equation:

$$\nabla^2 u(x,z) + \frac{\omega^2}{V^2(x,z)} u(x,z) = 0 \qquad (1)$$

wherein the function $u=u(x,z=0)$ describes two-dimensional waves that are received at a receiver at the earth's surface. In the function u, the independent variable x represents horizontal position relative to an arbitrary origin, and the independent variable z represents depth below the earth's surface. It should be noted that the function $u(x,z)$ is implicitly dependent upon the temporal frequency, $\omega$. also in equation (1), the function $V(x,z)$ defines the velocity of the wave at the point having the Cartesian coordinates (x,z).

Because a Gaussian beam is spatially localized about a ray path, it must have a finite number of spatial frequency components. Also, because each spatial frequency component of a Gaussian beam propagates in a slightly different direction, the beam width increases as its energy propagates. Because narrow Gaussian beams are inherently comprised of wide bands of spatial frequencies, those beams spread relatively quickly with downward travel. On the other hand, wider Gaussian beams (e.g., ones whose initial width is several wavelengths) propagate downward many wavelengths before spreading significantly.

According to the present invention, the initial step in the depth migration method comprises finding a finite set of Gaussian beams whose sum reproduces a wave field that has been recorded at the earth's surface. Thus, FIG. 3(a) shows a straight ray and a series of wave fronts that represent a monochromatic Gaussian beam at its instant of arrival at the earth's surface. FIG. 3(b) shows the wave amplitude, $\phi$, as measured along the earth's surface at the time of arrival. The latter figure shows that wave amplitude varies sinusoidally in the x-direction within a Gaussian envelope (i.e., a curve defined by a Gaussian function) centered about the ray path. As successive wave fronts arrive at the earth's surface along the ray path, the Gaussian envelope remains stationary but the wavelet oscillates within the envelope.

FIG. 4 shows a group of parallel Gaussian beams arriving at the earth's surface as a planar wavefront. This illustration is based upon the assumption of constant wave velocity. Further, this figure shows that the overall sum of the individual wavefronts is equivalent to a planar wavefront.

In the following, a process will first be described for decomposing a planar wavefield into component Gaussian beams. It should be understood, however, that wavefields that have non-planar shapes can be described as the sum of Gaussian beams having different amplitudes and phases. The process for decomposing a planar wavefield includes calculating a set of Gaussian beam functions whose sum, as evaluated at the earth's surface, is the plane wave:

$$u(x,z=0,K) = e^{iKx} \qquad (2)$$

where "K" is a constant.

To solve the foregoing equation, the sum of shifted Gaussian functions can be equated to unity; i.e., $$1 \approx \frac{1}{\sqrt{2\pi}} \frac{a}{\gamma} \sum_{m=-\infty}^{\infty} e^{-(x-x_m)^2/2\gamma^2} \qquad (3a)$$

where the variable "a" represents the distance that the Gaussian functions are shifted; i.e., $$x_m = a \cdot m, \text{ where } m=1,2,\ldots,M \qquad (3b)$$

and the variable $\gamma$ determines the Gaussian width.

In practice, relation (3a) is a good approximation if a $\leq 2\gamma$. In that case, equation (2) can be multiplied side-by-side with the approximation of equation (3a) to express the plane wave, $\phi(x,z=0,K)$ as a sum of localized components:

$$\phi(x,z=0,K) = e^{iKx} = \frac{1}{\sqrt{2\pi}} \frac{a}{\gamma} \sum_{m=-\infty}^{\infty} e^{iKx-(x-x_m)^2/2\gamma^2} \qquad (4)$$

As is well known, the mathematical expression for a Gaussian beam is:

$$u(s,n) = \left( \frac{v(s)}{q(s)} \right)^{\frac{1}{2}} e^{i\omega\tau(s) + \frac{i\omega p(s)}{2q(s)} n^2} \qquad (5)$$

which is an asymptotic solution of the wave equation. In the foregoing expression, the variables s and n are raypath coordinates. The function $\tau(s)$ represents travel time along the raypath. The functions p(s) and q(s) are auxiliary functions that can be determined by integrating simple differential equations along the raypaths. In practice, it is convenient to choose the initial values for those auxiliary functions as:

$$q(s_0) = \frac{\omega_r w^2_0}{V_0} \qquad (6a)$$

and $$p(s_0) = \frac{i}{V_0}. \qquad (6b)$$

In the preceding equations, the parameter $w_0$ specifies the initial beam width at a reference frequency, $\omega_r$, that characterizes the frequency spectrum present in the data. The velocity $V_0$ is the velocity at the point where the variables s and n are zero.

In the case where waves have constant velocity in the immediate neighborhood of the earth's surface, the auxiliary function p is constant, and the auxiliary function q is linear in the variable s. Under such conditions, the equation for a Gaussian beam reduces to:

$$u(s,n) = \left( \frac{V^2_0}{\omega_r w^2_0 + iV_0 s} \right)^{\frac{1}{2}} e^{(i\frac{\omega}{V_0} s - \frac{\omega}{2} (\omega_r w^2_0 + iV_0 s)^{-1} n^2)} \qquad (7)$$

Further in the above case, when a Gaussian beam arrives at surface location $x_m$, the ray path makes an angle $\theta$ as measured from vertical. Then as shown in FIG. 5, the transformation between standard Cartesian coordinates and ray-based coordinates for the ray arriving at $x_m$ is:

$$s = (x-x_m)\sin\theta - z\cos\theta \qquad (8a)$$

$$n = (x=x_m)\cos\theta + z\sin\theta \qquad (8b)$$

Further, by summing the transformations for a set of Gaussian beams that arrive at surface locations $x_m$, an emerging wavefield can be expressed as:

$$u_{GB}(x,z=0) = \sum_m \Psi_m \frac{V_0}{w_0} \omega_r^{-\frac{1}{2}}. \qquad (9)$$

$$\exp\left\{ i\omega \frac{\sin\theta}{V_0} (x - x_m) - \frac{\omega}{2\omega_r} \left( \frac{\cos\theta}{w_0} \right)^2 (x - x_m)^2 \right\}$$

where the coefficients $\psi_m$ are beam amplitudes.**

Upon comparison of equations (4) and (9), it can be understood that expansion of the Gaussian beam produces a plane wave when:

**This expression neglects the imaginary terms in the denominators of (7), which is the same as assuming that the beam curvature does not change significantly over the range of x where the beam intersects the surface z=0.

$$K = \frac{\omega}{V} \sin \theta, \quad (10)$$

$$\gamma = \frac{w_0}{\cos \theta} \sqrt{\frac{\omega_r}{\omega}}. \quad (10a)$$

Moreover, when it assumed that $a < 2\gamma$, the beam amplitudes can e expressed as:

$$\Psi_m = \left(\sqrt{\frac{\omega}{2\pi}}\right) a \frac{\cos \theta}{V_0} e^{iKx_m}. \quad (10b)$$

Under such conditions, equation (10a) requires the following beam spacing:

$$a \lesssim \frac{2w_0}{\cos \theta} \sqrt{\frac{\omega_r}{\omega}}. \quad (11)$$

The phase factor $e^{iKx_m}$ in equation (10b) serves to align the wavefronts of the Gaussian beams.

When Gaussian beams with initial values of the auxiliary functions p and q determined by equation (6) and amplitudes $\psi_m$ determined by equation (10b) arrive at the earth's surface at a spacing defined by equation (11) while traveling along raypaths having the same travel direction as a plane wave, the sum of the Gaussian beams is approximately equal to the plane wave along the surface as expressed by equation (2). Moreover, the sum of Gaussian beams for the cases above for $z > 0$ results in the extrapolated wavefield. It may be noted that the field is only a plane wave at $z=0$; for cases where $z > 0$, the field can be complex if $V(X,Z)$ varies.

FIGS. 3 and 4 illustrate the preceding discussion. As shown in FIG. 4(a), the Gaussian beams have the same dip as the plane wave defined by equation (2). Furthermore, in accordance with the approximation expressed by equation (3a), the sum of the amplitude profiles of the individual Gaussian beams equals a constant overall amplitude.

Any wavefield that has been recorded at the earth's surface can be expressed as the sum of plane wave components as follows:

$$u(x,t) = \sum_{\omega K} A_{\omega K} e^{i(Kx - \omega t)}. \quad (12)$$

Although each of those plane wave components can be decomposed into Gaussian beams and migrated, such processing is cumbersome. In particular, such processing requires computation of a set of rays for each plane wave component (i.e., for each pair of $\omega$ and K). The present invention, however, overcomes these difficulties by evaluating plane wave components within wedge-shaped regions of the $\omega$-K plane. The evaluations are based upon the assumption that the plane wave components within wedge-shaped regions travel in approximately the same direction. More particularly, it is assumed that all of the plane wave components within wedge-shaped regions in the $\omega$-K plane travel in the same direction when components within the region are defined by the relationship:

$$\omega p_j < K < \omega p_{j+1}, \quad (13a)$$

where $$p_j = \Delta p_x \cdot j \text{ and } j = -N_p, \ldots, 1, 2, \ldots, N_p. \quad (13b)$$

Given the constraint expressed by equation (13b), all plane waves that satisfy equation (13a) for a particular value of "j" can be extrapolated (i.e., depth migrated) using only ray paths that arrive at the surface with ray parameters of $p_j$ and $p_{j+1}$. In other words, all of the plane wave components within a single wedge-shaped region of the $\omega$-K plane can be extrapolated on a single set of Gaussian beam rays. In practice, ray tracing is done for about fifty to one-hundred rays indifferent travel directions, and the fans of rays are shot from surface points spaced by about ten to twenty common midpoint intervals.

Generally speaking, any arbitrary plane wave can be decomposed into Gaussian beam components using only the initial raypath directions determined by equation (13b). To accomplish such a decomposition, there needs to be only small differences in the travel direction of the plane wave and the Gaussian beam rays.

To allow for differences in travel directions of plane waves and Gaussian beam rays, a plane wave can be expressed as follows:

$$e^{iK_0x - i\omega t} \quad (14)$$

where the wave has ray parameter $p_{xo}$ and travel direction $\theta_o$. These parameters are related to the parameters $\omega$ and $K_o$ by the equations:

$$p_{x0} = \frac{\sin \theta_0}{V_0} = \frac{K_0}{\omega}. \quad (15a)$$

For a plane wave of equation (14), the parameter "j" can be chosen such that:

$$K_o = \omega[p_j + (\Delta p_x \cdot d)] = \omega[p_{j+1} - \Delta p_x(1-d)] \quad (16)$$

where $$0 \leq d \leq 1 \quad (17)$$

and where the angles $\theta_j$ are defined as:

$$\theta_j = \sin^{-1}(V_o p_j). \quad (18)$$

As a practical matter, when approximating a plane wave by a weighted sum of super-positioned Gaussian beams arriving at the earth's surface at angles $\theta_j$ and $\theta_{j+1}$, it can be assumed that the weighting is linear. Therefore, the approximated plane wave can be expressed as:

$$e^{iK_0x} = (1-d)u_j(x) + d\, u_{j+1}(x) \quad (19)$$

where the function $u_j(x)$ is the sum of the Gaussian beams traveling in direction $\theta_j$ in accordance with equation (9). Then, by substituting equations (16) and (17) into equation (9), the Gaussian beam sum can be expressed as:

$$u_j(x) = e^{iK_0x} \sum_m \Psi_{jm} \frac{V_0}{w_0} \omega_r^{-1} e^{-iK_0 a m}. \quad (20)$$

-continued $$\exp\left(-i\omega\Delta p_x d(x-am) - \frac{\omega}{2\omega_r}\left(\frac{\cos\theta_j}{w_0}\right)^2 (x-am)^2\right)$$

The approximation expressed by equation (3a) can be generalized to:

$$1 \approx C \sum_{m=-\infty}^{\infty} e^{i2\pi a(x-ma)} e^{-(x-ma)^2/2\gamma^2} \quad (20a)$$

where $$C = \frac{a}{\gamma\sqrt{2\pi}} e^{2(\pi\gamma a)^2} \quad (20b)$$

with the restriction that:

$$\frac{\gamma(1-2|\alpha|a)^{\frac{1}{2}}}{a} \geq \frac{1}{2}. \quad (20c)$$

The relationships expressed in equation (20a) can be established by Fourier analysis. According to equations (20a) to (20c), the function expressed by equation (20) approximates the plane wave of equation (14) under the following conditions:

$$\Psi_{jm} = \sqrt{\frac{\omega}{2\pi}} \, a \frac{\cos\theta_j}{V_0} e^{iK_0 am} \exp\left[\frac{\omega\omega_r}{2}\left(\frac{w_0\Delta pd}{\cos\theta_j}\right)^2\right] \quad (21)$$

and $$\frac{w_0}{a} \sqrt{\frac{\omega_r}{\omega}} \left(1 - \frac{w\Delta p_x a}{\pi}\right)^{\frac{1}{2}} \geq \frac{1}{2}. \quad (22)$$

Rapid spreading of a Gaussian beam can be avoided by choosing the parameter $w_0$ such that the initial beam width is several wavelengths. Appropriate typical choices for values of the variable $a$ and $\Delta p_x$ are:

$$a = (1.25) w_0 \quad (23a)$$

and $$\Delta p_x = \frac{\pi}{2w_0\omega_h}. \quad (23b)$$

In the preceding equation, variable $\omega_h$ characterizes the higher frequency data. The amplitude terms in equation (21) contain the phase shift $e^{ik_0 am}$ between the Gaussian beams. As a result, phase errors in the terms of the sum expressed by equation (19) do not accumulate even when Gaussian beams are slightly misaligned with the plane wave.

Because the plane wave expressed by equation (14) can be represented by the summation in equation (20), any plane waves that fall within the region bounded by $p_{j-1}$ and $p_{j+1}$ contribute to the amplitudes of the Gaussian beams having ray parameter $p_j$. Thus, when these components are summed with linear weights in accordance with equation (19), the total amplitude of a Gaussian beam that arrives at the location $x_m$ from direction $K_j$ can be expressed as:

$$B_{jm}(\omega) = \sqrt{\frac{\omega}{2\pi}} \, \frac{a\cos\theta_j}{V_0} \cdot \quad (24a)$$

$$\left\{ \sum_{K_{j-1}<K<K_{j+1}} |1-d|e^{iKx_m}\exp\left(\frac{\omega\omega_r(w_0\Delta p_x d)^2}{2\cos^2\theta_j}\right) A_\omega K \right\}$$

where $$K_j = \omega p_j, \text{ and} \quad (24b)$$

$$d = ](K/\omega) - p_j]\Delta p_x. \quad (24c)$$

In equation (24a), the summation notation comprises a frequency-domain expression for a local slant stack. Thus, the equation determines the amplitude of a Gaussian beam that has ray parameter $p_j$ and intersects the surface at position $x_m$.

After the function $B_{jm}(\omega)$ is determined using equation (24a), the field contribution by any one of the Gaussian beams can be calculated for Cartesian coordinates (x,y) at any given time by using the following relationship:

$$u_{jm}(x,z,t) = \int_{-\infty}^{\infty} d\omega B_{jm}(\omega) \sqrt{\frac{v}{q}} \, e^{i\omega(\frac{\tau+pn^2}{2q}) - i\omega t} \quad (25)$$

Because depth migration requires only knowledge of a field at the time $t=0$, the migrated wavefield can be efficiently computed in the time domain. This can be accomplished by, for instance, computing values for a function $B_{mj}(t,\alpha)$ defined by the equation:

$$B_{jm}(t,\alpha) = \int_{-\infty}^{\infty} d\omega B_{jm}(\omega) e^{-\alpha\omega} e^{-i\omega t} \quad (26)$$

and storing (e.g., in computer memory) the complex quantity:

$$\bar{B}_{jm}(t,\alpha) = B_{jm_r}(t,\alpha) + iH\{B_{jm}(t,\alpha)\} \quad (27)$$

for values of the parameter $\Delta$ in the range $$0 < \alpha < \frac{3}{2\pi f_{min}}. \quad (28)$$

In equation (27), the operator H denotes a Hilbert transform. The parameter $f_{min}$ designates the minimum frequency for which there is significant recorded energy.

In equation (26), the factor $e^{-\alpha\omega}$ provides an exponential filter. Thus, for the case where the parameter $\alpha = 0$, the exponential filter provides the inverse Fourier transform of the frequency-domain function $B_{jm}(\omega)$.

To obtain the field $u_{jm}(x,z,t)$ at a location (x,y), the following frequency-independent complex function can be computed from ray path information:

$$\phi(x,z) = \tau + \frac{pn^2}{2q}. \quad (29)$$

The wavefield at (x,z,t) contributed by a single Gaussian beam is:

$$u_{jm}(x,z,t) = Re\left\{ \bar{B}_{jm}(t - \phi_r, \phi_i) \sqrt{\frac{v}{q}} \right\}. \quad (30)$$

Equation (30) projects the recorded seismic energy into the earth. Function $\bar{B}_{jm}$ contains the recorded seismic information and function $\phi(x,z)$ provides the raypath information for the extrapolation. The real part of the expression is taken because, in general, the variable "q" is a complex number. In practice, acceptable results can be obtained by computing the function $B_{jm}(t,\alpha)$ for a sampling of the variable $\alpha$ at as few as eight sample points that are uniformly-spaced.

In summary, the above-discussed Gaussian beam migration method comprises the steps of:

1) By Fourier methods, transforming recorded data sets into plane wave components using the relationship:

$$u(x,t) = \sum_{\omega K} A_{\omega K} e^{i(Kx - \omega t)}. \quad (31)$$

2) Expressing each plane wave component as a set of upcoming Gaussian beams by, for example, summing the plane wave components within accurate segments in the $\omega$-K plane to obtain an amplitude function, $B_{jm}(\omega)$, via equations (24a) and (24b), viz.:

$$B_{jm}(\omega) = \sqrt{\frac{\omega}{2\pi}} \frac{a \cos \theta_j}{V_0} \cdot \quad (32)$$

$$\left\{ \sum_{K_{j-1} < K < K_{j+1}} |1 - d| e^{iKx_m} \exp\left( \frac{\omega \omega_r (w_0 \Delta p_x d)^2}{2 \cos^2 \theta_j} \right) A_{\omega K} \right\}$$

where $K_j = \omega p_j$.

3) Filtering and transforming each amplitude function $B_{jm}(\omega)$ by using an equation such as:

$$B_{jm}(t,\alpha) = \int_{-\infty}^{\infty} d\omega B_{jm}(\omega) e^{-a\omega} e^{-i\omega t}. \quad (33)$$

4) Migrating the energy by ray tracing methods and constructing wave fields about raypaths by using the following equation:

$$\phi(x,z) = \tau + \frac{pn^2}{2q} \quad (34)$$

and $$u_{jm}(x,z,t) = Re\left\{ \bar{B}_{jm}(t - \phi_r, \phi_i) \sqrt{\frac{v}{q}} \right\}. \quad (35)$$

5) Forming post-stack images of subsurface reflectors by evaluating the extrapolated field at time t=0.

One of the major benefits of the above-discussed techniques is that Gaussian beam basis functions can be used for extrapolations in pre-stack migrations. In fact, the same set of Gaussian beam basis functions can be used to compute the field generated by a point source anywhere along the earth's surface. A simplified example of this is provided by considering an image produced by a single trace that has been computed by crosscorrelating point source fields radiating from the source and receiver points associated with the trace. In such a case, to migrate a neighboring trace, the Gaussian beams do not need to be recomputed but can be summed with different amplitudes to account for the changes in source and receiver positions.

In practice, pre-stack migrations can operate on common offset panels, thereby overcoming the so-called limited aperture problems that occur with conventional profile migration routines. Common-offset panel migration also has the advantage that each common offset panel can comprise the partial stack of data recorded over a limited offset range, thereby reducing the volume of data that must be processed and alleviating problems caused by irregular recording geometry. Still further, partial stacking allows stacking to be distributed in selected proportions both before and after migration.

To migrate common offset sections, the delta function $$\delta_{xx'} = \begin{cases} 1 \text{ if } x = x \\ 0 \text{ if } x \neq x \end{cases} \quad (36)$$

can be written in terms of Fourier components:

$$\frac{1}{N_K} \sum_K e^{iK(x-x')} = \sigma_{xx'}. \quad (37)$$

It can be understood that the function $u_b(x,z; x_b, \theta)$ denotes a Gaussian beam that arrives at a surface location $x_b$ while traveling in the following direction: $\theta = \sin^{-1}(KV_0/\omega)$. The plane wave $e^{iKx}$ can be expressed as a sum of Gaussian beams evaluated at the surface z=0. That is, equation (9) with coefficients (10b) results in the following plane wave:

$$e^{iKx} = \sqrt{\frac{\omega}{2\pi}} \left( \frac{a \cos \theta}{V_0} \right) \sum_m^n e^{iKx_m} u_b(x, z = 0; x_m, \theta) \quad (38)$$

$$= \frac{1}{\sqrt{2\pi}} \sqrt{\frac{\omega}{\omega_r}} \frac{a \cos \theta}{w_0} \sum_m e^{iKx_m} \cdot$$

$$\exp\left\{ i\omega \frac{\sin \theta}{V_0} (x - x_m) - \right.$$

$$\left. \frac{\omega}{2\omega_r} \left( \frac{\cos \theta}{w_0} (x - x_m)^2 \right) \right\}.$$

Then, equatrions (37) and (38) can be combined to provide an expression that describes a wavefield radiating from a point dipole source located at x', namely:

$$\sqrt{\frac{\omega}{2\pi}} \frac{a}{N_K V_0} \sum_K \cos \theta \sum_m e^{iK(x_m - x')} u_b(x,z; x_m, \theta). \quad (39)$$

Employing the expression U(y,h) to denote a seismic trace recorded at midpoint "y" and offset "h" the receiver field can be extrapolated by using equation (39). Then, the point source field can be forward modeled by Gaussian beam summation:

$$u(r, x_b) = \frac{\sigma}{V} \int dK \, e^{i(x_b - x')K} u_b(r; x_b, \theta). \quad (40)$$

where $$\sigma = \omega_r^{1/2} \omega_o$$

In equation (40), the variable "r" denotes the position at which the field is observed. The variables x' and $x_b$ denote, respectively, the surface locations of the source point and the point from which rays are launched for the Gaussian beams. In practice, equation (40) is an appropriate approximation if:

$$|x' - x_b| \sin \theta < |r|.$$

The migrated image at point r=(x,z) of the one trace can then be expressed as follows:

$$\sum_\omega U(y,h) \sqrt{\frac{\omega}{2\pi}} \frac{a}{V_0 N_K} \sum_K \cos \theta \sum_m e^{iK[(ma-h)-(y-h)]} u_b(r; ma - h, \theta) \frac{\sigma}{V_c N_K} \sum_{K'} e^{iK'[(ma+h)-(y+h)]} u_b(r; ma + h, \theta'). \quad (41)$$

It can be understood that equation (41) represents the cross-correlation of the extrapolated recorded field with the forward modeled source field. Thus, the equation determines the contribution to the image from the trace recorded at midpoint y.

The choice of the surface location $x_m$ in accordance with equation (38) is valid if the incremental distance a is restricted by relation (20c). The value of the source field does not depend on surface locations $x_b$ if as $x_b$ is near x'.

The complete migrated image of an offset panel is obtained by summing equation (41) over midpoint "y." The migrated image is:

$$I(r;h) = \frac{a\sigma}{V_0 N_K} \sum_\omega \sqrt{\frac{\omega}{2\pi}} \sum_{kk'} \sum_m U(K + K',h) \cdot \quad (42)$$

$$\cos \theta \, e^{i(K+K')am} u_b(r;mah,\theta) u_b(r;ma + h,\theta').$$

In practice, it is convenient to change variables as follows:

$$K \rightarrow \tfrac{1}{2}K + \Delta K, \text{ and } K' \rightarrow \tfrac{1}{2}K - \Delta K. \quad (43a \text{ and } 43b)$$

Then, equation (42) becomes:

$$I(r;h) = \frac{a\sigma}{V_0 N_K} \sum_\omega \sqrt{\frac{\omega}{2\pi}} \sum_k \sum_m e^{iKam} U(K,h) \cdot \quad (44)$$

$$\sum_{\Delta k} \tfrac{1}{2}(\cos \theta + \cos \theta') \mu_b(r;ma - h,\theta) u_b(r;ma + h,\theta').$$

where the angles and $\theta$ + are determined by the relationships:

$$\theta = \arcsin\left[\frac{V_c(\tfrac{1}{2}K + \Delta K)}{\omega}\right] \text{ and} \quad (45a)$$

$$\theta' = \arcsin\left[\frac{V_c(\tfrac{1}{2}K - \Delta K)}{\omega}\right]. \quad (45b)$$

Angle $\theta$ is the direction of the ray arriving at the detectors and $\theta'$ is the direction of the ray leaving the source.

Equation (44), which resulted from combining equation (39) with the point source formula (40), has the computational advantage of including only a single summation over the index "m" while describing the extrapolation of $\omega$-K components from a common offset section. As in the post-stack case, the data can be "pie sliced" for allowing performance of computations in the time domain. The steps for accomplishing this are the same as for the post-stack case except for the modifications that will now be described.

In equation (24a), the term $B_{jm}$ denotes the component of the data that has the time dip $p_j$. In contrast to the post-stack case, the component $B_{jm}$ is associated with ray pairs that have arrival ray parameters that sum to $p_j$; that is, $$p_j = \left(\frac{p_j}{2} - \Delta p\right) + \left(\frac{p_j}{2} + \Delta p\right). \quad (47)$$

Thus, the image component contributed by each component $B_{jm}$ requires summation over $\Delta p$.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A process for depth migrating common offset sections of seismic wave information that has been derived from geological media that causes lateral velocity variations in seismic waves, comprising:
    (a) decomposing common offset recordings of wavefields using Gaussian beams as basis functions;
    (b) summing the Gaussian beams and using the summation to describe the downward extrapolation of the common offset wavefields to generate a depth-migrated extrapolated recorded field;
    (c) forward modeling the source fields using Gaussian beams to produce a forward modeled source field; and
    (d) cross-correlating the extrapolated recorded field with the forward modeled field to generate depth migrated images.

2. A process according to claim 1 wherein the step of decomposing common offset wavefields is accomplished by two-dimensional fourier synthesis.

3. A process according to claim 2 wherein the two-dimensional Fourier synthesis of a recorded wavefields u(x,t) is accomplished by use of the following equation:

$$u(x,t) = \sum_{\omega K} A_{\omega K} e^{i(Kx - \omega t)}.$$

4. A process according to claim 3 wherein the step of summing the determined basis functions comprises summing plane wave components within accurate segments in the $\omega$-K plane to obtain the amplitude function $B_{jm}(\omega)$ via the following equation:

$$B_{jm}(\omega) = \sqrt{\frac{\omega}{2\pi}} \frac{a\cos\theta_j}{V_0} \cdot$$

$$\left\{ \sum_{K_{j-1} < K < K_{j+1}} |1 - d| e^{iKxm} \exp\left(\frac{\omega\omega_r(w_0\Delta p_x d)^2}{2\cos^2\theta_j}\right) A_{\omega K} \right\}$$

where $K_j = \omega p_j$, and $d = [(K/\omega) - p_j]\Delta p_x$.

5. A process according to claim 4 wherein the step of describing the downward extrapolation of the recorded wavefield to generate depth-migrated images includes the steps of filtering and transforming each accurate component $B_{jm}(\omega)$ by the equation $$B_{jm}(t,\alpha) = \int_{-\infty}^{\infty} d\omega B_{jm}(\omega) e^{-\alpha\omega} e^{-i\omega t}.$$

6. A process according to claim 5 wherein the migration is downward extrapolated by ray tracing using the following equations:

$$\phi(x,z) = \tau + \frac{pn^2}{2q}$$

then, $$u_{jm}(x,z,t) = Re\left\{ \bar{B}_{jm}(\phi_r, \phi_i) \sqrt{\frac{v}{q}} \right\}.$$

7. A process according to claim 6 wherein the following equation is used to pre-stack migrate common offset sections:

$$I(r;h) = \frac{a\sigma}{V_0 N_K} \sum_\omega \sqrt{\frac{\omega}{2\pi}} \sum_{kk'} \sum_m U(K + K',h) \cdot$$

$$\cos\theta \; e^{i(K+K')am} \; u_b(r;mah,\theta) \; u_b(r;ma + h,\theta').$$

* * * * *

UNITED STATES PATENT AND TRADEMARK OFFICE
CERTIFICATE OF CORRECTION

PATENT NO. : 5,274,605
DATED : December 28, 1993
INVENTOR(S) : N. Ross Hill

It is certified that error appears in the above-identified patent and that said Letters Patent is hereby corrected as shown below:

Claim 2, Col. 14, line 56      "fourier synthesis." should read --Fourier synthesis.--

Claim 4, Col. 14, line 68      "within accurate" should read --within arcuate--

Claim 5, Col. 15, line 16      "each accurate component" should read --each arcuate segment component--

Signed and Sealed this

Thirtieth Day of August, 1994

Attest:

BRUCE LEHMAN

Attesting Officer      Commissioner of Patents and Trademarks